United States Patent
Han (10) Patent No.: US 7,149,386 B2
(45) Date of Patent: Dec. 12, 2006

(54) ASYMMETRIC ARRAYED WAVEGUIDE GRATING

(75) Inventor: Dong-Kyoon Han, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 154 days.

(21) Appl. No.: 10/918,568

(22) Filed: Aug. 13, 2004

(65) Prior Publication Data

US 2005/0157984 A1 Jul. 21, 2005

(30) Foreign Application Priority Data

Jan. 19, 2004 (KR) ............... 10-2004-0004005

(51) Int. Cl.
G02B 6/34 (2006.01)
G02B 6/42 (2006.01)

(52) U.S. Cl. ............... 385/37; 385/14; 385/24; 385/50

(58) Field of Classification Search ............ 385/37
See application file for complete search history.

(56) References Cited

U.S. PATENT DOCUMENTS 6,069,990 A * 5/2000 Okawa et al. ............. 385/43
6,181,849 B1 * 1/2001 Lin et al. ................... 385/24
6,222,956 B1 * 4/2001 Akiba et al. ............... 385/24
6,466,707 B1 * 10/2002 Dawes et al. .............. 385/14
6,466,715 B1 * 10/2002 Akiba et al. ............... 385/37
6,768,832 B1 * 7/2004 Nakajima et al. .......... 385/24
6,768,842 B1 * 7/2004 Bulthuis et al. ........... 385/37
6,801,691 B1 * 10/2004 Berini ....................... 385/39
2003/0012501 A1 * 1/2003 Nakajima et al. .......... 385/37
2003/0063858 A1 * 4/2003 Bulthuis et al. ........... 385/37

FOREIGN PATENT DOCUMENTS

JP 2005208645 A * 8/2005

* cited by examiner

*Primary Examiner*—Brian Healy
*Assistant Examiner*—Mary El-Shammaa
(74) *Attorney, Agent, or Firm*—Cha & Reiter,LLC.

(57) ABSTRACT

Disclosed is an asymmetric arrayed waveguide grating comprising at least one input waveguide, at least one output waveguide, a first slab waveguide connected to the input waveguide, a second slab waveguide connected to the output waveguide, and a plurality of channel waveguides connecting the first and second slab waveguides. The first and second slab waveguides are left-right asymmetrically formed with reference to a centerline of the channel waveguides.

16 Claims, 3 Drawing Sheets

ASYMMETRIC ARRAYED WAVEGUIDE GRATING

CLAIM OF PRIORITY

This application claims priority, pursuant to 35 USC §119, to that patent application entitled "Asymmetric Arrayed Waveguide Grating," filed with the Korean Intellectual Property Office on Jan. 19, 2004 and assigned Serial No. 2004-4005, the contents of which are hereby incorporated by reference.

BACKGROUND OF THE INVENTION

1. Field of the Invention

The present invention relates to optical communication and more specifically, to an arrayed waveguide grating (AWG) wavelength division multiplexer.

2. Description of the Related Art

In an optical communication system, an arrayed waveguide grating serves as a filter for dividing or combining one or more optical wavelengths. Such an arrayed waveguide grating may also be employed as a bi-directional wavelength filter that is capable of bi-directionally diverging lights of different wavelength bands do not interfere with each other when they intersect one another. An AWG is conventionally formed by modifying the configuration of an existing concave diffraction grating of reflection type into that of a transmission type. A concave diffraction grating of reflection type follows a well-known Rowland circular configuration, which was proposed by H. A. Rowland in 1882.

Figure 1:
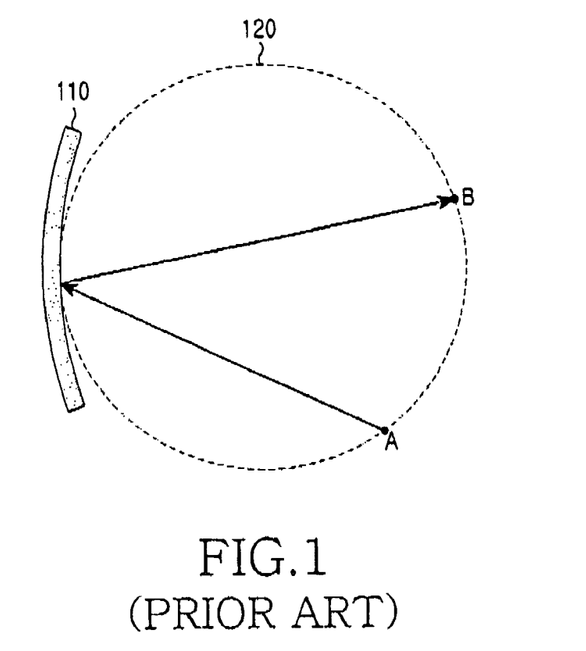
FIG. 1 is a drawing for illustrating a typical Rowland circle configuration.

FIG. 1 illustrates a typical Rowland circle configuration, wherein there is a concave diffraction grating 110 of reflection type and a Rowland circle 120 corresponding to the grating. In such a configuration, a position A of an incident point and a position B of a focal point of outputting lights (or an exiting point) may be varied depending on one or more design variables for configuring such a concave diffraction grating 110. However, they can not deviate from the Rowland circle 120 in any case.

By using such a relationship between a concave diffraction grating and a Rowland circle, it is possible to configure an AWG of transmission type. That is, an AWG of transmission type is configured in such a way that a concave diffraction grating of reflection type having an incident point and an exiting point on one Rowland circle is divided into two sections (input and output sides), thereby forming two plane waveguides (typically, each referred to as "slab waveguide") of a Rowland circle configuration, and a plurality of channel waveguides are connected between the two plane wave guides.

Figure 2:
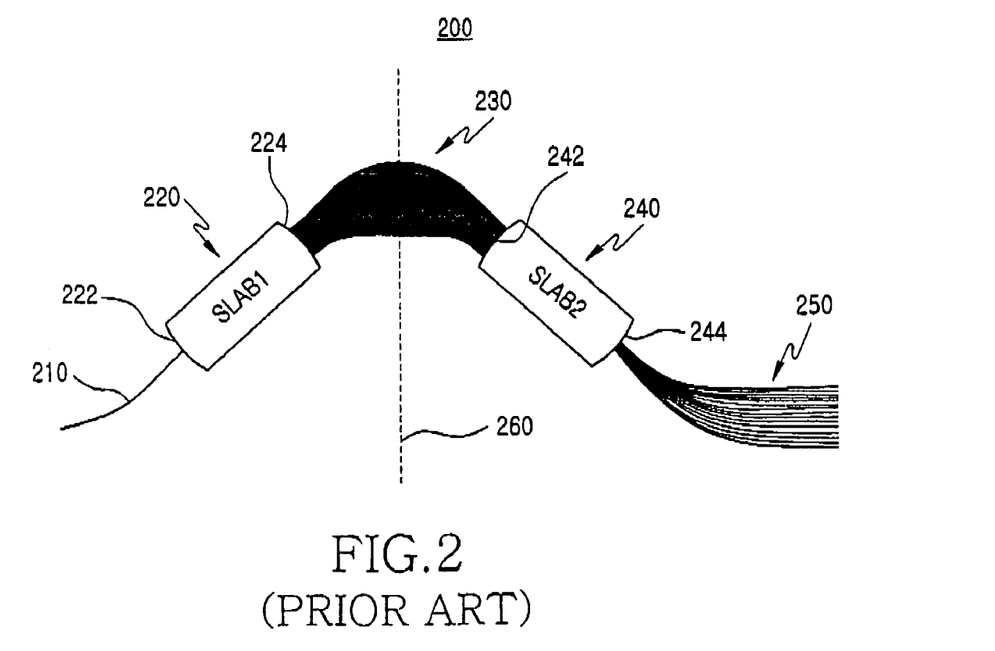
FIG. 2 shows a typical AWG configuration.

FIG. 2 shows a configuration of a typical AWG. The AWG 200 comprises an input waveguide 210, a first slab waveguide 220, a plurality of channel waveguides 230 forming an arrayed waveguide region (AWR), a second slab waveguide 240, and a plurality of output waveguides 250. The input waveguide 210 is connected to a first end face 222 of the first slab waveguide 220 and the channel waveguides 230 connect a second end face 224 of the first slab waveguide 220 and a first end face 242 of the second slab waveguide 230. The plurality of output waveguides 250 are connected to a second end face 244 of the second slab waveguide 240 (the second end face being typically referred to as "image plane"). The first and second slab waveguides 220 and 240 separated into the left and right sides from the AWG 200 are formed by dividing those having theoretically been united in a single body. Therefore, the AWG 200 has a basic configuration (consisting of the first and second slab waveguides 220, 240 and the channel waveguides 230 ) which is exactly left-right symmetric with reference to centerline 260 of the channel waveguides 230 (or the centerline of the AWG). However, it is possible to optionally select the number and arrangement of the input waveguide 210 and output waveguides 250 as needed. In addition, because the physical basic configuration of the AWG 200 is symmetric, the operating characteristics of the AWG 200 also have reciprocity regardless of directions.

Because an AWG is typically used in one direction only, it has a same characteristic due to its reciprocity regardless of being used in any direction. Therefore, the difference between the input side and output side in an AWG are not results of a difference in configuration but determined according to how to use the AWG. Because such an AWG is normally used in one direction for one wavelength band, the conventional configuration may be appropriate without any problem in such a case. However, if it is intended to use such an AWG in both directions, i.e., if it is intended to use the AWG in such a manner that it operates upon different wavelength bands in different directions, a problem may be caused. Because such a conventional configuration has no difference in direction, it would seem natural that it can be made to operate for one of two wavelength bands.

Figure 3:
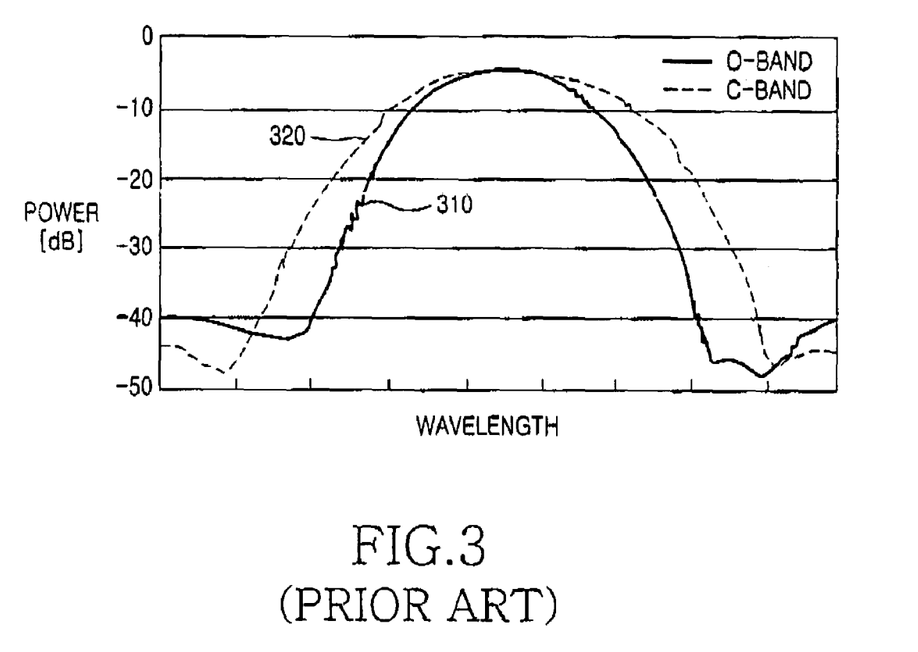
FIG. 3 is a graph for illustrating output characteristics of the AWG shown in FIG. 2.

FIG. 3 is a graph for illustrating output characteristics of the AWG shown in FIG. 2. FIG. 3 shows a first output spectrum 310 of light operating in O-band, of which the central wavelength is 1295 nm, and superimposed thereon a second output spectrum 320 of light operating in C-band, of which the central wavelength is 1550 nm. As can be seen from the FIG. 3, the O-band output spectrum 310 shows 30% decrease in bandwidth as compared to the C-band spectrum 320, although there is little difference in insertion loss between the O-band and C-band output spectrums. Such a result is caused by the fact that when an AWG designed for use in one wavelength band is used in another wavelength band, its physical properties, e.g., refractive index, are substantially changed due to the change of wavelength bands and, thus, its operating characteristics are also proportionally changed. Because the AWG 200 is a component having a symmetric basic configuration, it is difficult to find a method for counterbalancing such a phenomenon.

As described above, there is a problem in that a conventional AWG is not suitable for a bi-directional dual-band AWG which operates on different wavelength bands in different directions, respectively, because its basic configuration is left-right symmetric.

SUMMARY OF THE INVENTION

Accordingly, the present invention has been made to solve the above-mentioned problems occurring in the prior art, and an object of the present invention is to provide a novel configuration, which is modified from a non-directional symmetric configuration of a conventional AWG in such a way that a directionality is introduced as an operational characteristics, thus making a single component have appropriate characteristics for different wavelength bands when lights proceeding in different directions from each other pass through the component.

In order to achieve the above object, there is provided an asymmetric arrayed waveguide grating comprising at least one input waveguide, at least one output waveguide, a first slab waveguide connected to the input waveguide, a second slab waveguide connected to the output waveguide, and a plurality of channel waveguides connecting the first and second slab waveguides, wherein the first and second slab waveguides are left-right asymmetrically formed with reference to a centerline of the channel waveguides.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawing. For the purpose of clarity, in the following description, detailed descriptions of known functions and configurations incorporated herein will be omitted when it may make the subject matter of the present invention unclear.

Hereinbelow, a description will be made in reference to an arrayed waveguide grating (AWG) comprising a first slab waveguide, an arrayed waveguide region (AWR) consisting of a plurality of channel waveguides, a second slab waveguide, and a plurality of output waveguides. The relationship between a central wavelength in an operating wavelength band of the AWG and a difference in length of the channel waveguides connecting the first and second slab waveguides are defined by equation 1 as follows.

$$n_c \Delta L = m \lambda_c \quad [1]$$

where, $n_c$ indicates an effective refractive index of the channel waveguides;

$\Delta L$ indicates a difference in length between adjacent channel waveguides;

m is a diffraction order; and $\lambda_c$ indicates a central wavelength.

The effective refractive index of the channel waveguides are determined by the material and dimension of the channel waveguides, the central wavelength and diffraction order are determined in consideration of the operating wavelength band of the AWG. With these values known, the $\Delta L$ can be calculated from equation 1.

A grating equation representing the wavelength characteristics of an AWG is defined by equation 2 as follows.

$$n_c \Delta L + n_s d \sin \theta = m \lambda \quad [2]$$

where, $n_s$ indicates an effective refractive index of the first and second slab waveguides; and d indicates a pitch of the channel waveguides.

Equation 2 is derived based on the assumption that the input waveguide is connected to a focal point of the first slab waveguide and, thus, there is no path difference in the first slab waveguide. In equation 2, the first term ($n_c \Delta L$) of the left side represents a phase difference between adjacent channel waveguides in the AWR, and the second term ($n_s d \sin \theta$) represents a phase difference between adjacent optical paths in the second slab waveguide. The maximum constructive interference will be produced at a position where the sum of such phase differences becomes a multiple of a diffraction order given for an operating wavelength.

By differentiating both sides of equation 2 with respect to wavelength, equation 3 is derived, which explains the operation of the AWG according to change of wavelength.

$$\frac{dx}{d\lambda} = \frac{fm}{n_s d} \quad [3]$$

Equation 3 is based on the assumption that the change of refractive index depending on wavelength is relatively small, and the equation 3 can be used when a wavelength in practical use is defined within a known band, e.g., O-band, S-band, C-band or L-band, without so large an error. The unit of $$\frac{ds}{d\lambda}$$

is micrometers/nanometers ($\mu m/\eta m$), which represents the distance, over which a focused image moves on an image plane as being changed by a unit wavelength (1 $\eta m$).

Equations 1 to 3 are applicable when the AWG is used in one wavelength band only. However, if the AWG is used in two wavelength bands, two cases, described in more detail subsequently, shall be taken into consideration. When the AWG is used in two wavelength bands, a changing range of wavelength will be much wider as compared to the case in which the AWG is used in only one wavelength band. Therefore, a change in physical properties (e.g. a change in refractive index) due to the change of wavelength shall be included.

Following equation 3 to 7 are design equations which shall be taken into consideration when the AWG is operating on two wavelength bands.

$$n_c(\lambda_1) \Delta L = m_1 \lambda_{c1} \quad [4]$$

$$n_c(\lambda_2) \Delta L = m_2 \lambda_{c2} \quad [5]$$

$$\frac{dx}{d\lambda_a} = \frac{fm_1}{n_{s1} d} \quad [6]$$

$$\frac{dx}{d\lambda_b} = \frac{fm_2}{n_{s2} d} \quad [7]$$

In this case, the two wavelength bands are referred to as "a-band" and "b-band." The a-band and b-band each may be an optional wavelength band which a user desires. In order to exemplify a change in characteristics for the two wavelength bands, equation 8 represents a bandwidth which is one of the important specifications of an AWG as follows.

$$B \propto A\Delta x \frac{d\lambda}{dx} = A\Delta x \frac{n_s d}{fm} \qquad [8]$$

where,

B is a bandwidth;

A is a coefficient proportional to the convolution of an image on an image plane of the second slab waveguide and a mode of the output waveguide; and $\Delta x$ is a width of the output waveguide.

The principle, by which the bandwidth represented by equation 8 among the operational characteristics of the AWG is changed according to a wavelength band, will be described below.

Firstly, a first central wavelength, $\lambda_{c1}$, is established in the a-band intended to be used, and the first diffraction order, $m_1$, is determined by taking the size of the a-band and a free spectral range (FSR) into consideration. The first effective refractive index $n_c(\lambda_1)$ at the first central wavelength determined is one of the physical properties determined according to a dimension of the channel waveguides and a material system for use in fabricating the AWG if the dimension and material system are determined. The remaining parameter, $\Delta L$, is determined by the three parameters as described above and equation 4. $\Delta L$ is a difference in length between adjacent channel waveguides in the arrayed waveguide region (AWR) between the first and second slab waveguides, and the physical layout of the AWG is determined by $\Delta L$. Because $\Delta L$ is not a variable that is changed according to the change of wavelength, it serves as a constant having a same value in equation 5 described above as well.

If $\Delta L$ determined from equation 4 is applied to equation 5 in the b-band, a permissible range of $m_2$ is determined by taking the wavelength range in use (or FSR) in the b-band into consideration, and according to this, both $n_c(\lambda_2)$ and $\lambda_{c2}$ are determined in unison. After these parameters are determined in this manner, it is possible to analogize the change of bandwidth according to a wavelength band from equation 8.

Since output waveguides of a same configuration are employed, $A\Delta x$ in equation 8 may be considered as a constant. Of course, $A\Delta x$ is not a complete constant because modes of output waveguides are varied depending on wavelength. However, because the variation is relatively small as compared to a change of other parameters, $A\Delta x$ may be considered as a constant. It can be appreciated that a band width is depend on the last term $n_s d/fm$ in equation 8. In the last term, the variables varied depending on wavelength are only the effective refractive index of the first and second slab waveguides $n_s$ and the diffraction order m. Accordingly, if the change of either of these variables according to wavelength is calculated, it is possible to calculate bandwidths in the "a-band" and "b-band."

In order to describe the changes of bandwidths according to change of wavelength, hereinbelow an O/C dual-band 16 channel will be described by way of an example.

The central wavelength $\lambda_{c1}$ in C-band is set to 1552.52 ηm, the wavelength gap between channels is set to 0.8 ηm, and then the diffraction order $m_1$ is determined by taking the number of channels in use, i.e., 16-CH, into consideration and for the purpose of reducing loss uniformity over channels. In this case, the FSR is about 19.4 ηm, which will come to 24.3 if calculated in terms of the number of channels. It will be assumed that the difference in refractive index between a cladding material and a core material is 0.75%, the size of the core is 6.5 ηm, and $n_c(\lambda_1)$ is 1.4527. In practice, the refractive index may be varied depending on compositions forming the core and cladding, and the difference in content of dopants. In this case, according to equation 4, $\Delta L$ equals to 85.50 mm.

Considering that the central wavelength and diffraction order in O-band are integers, if the remaining parameters are calculated from equation 5, the results will be $n_c(\lambda_2)$= 1.45645, $\lambda_{c2}$=1324.7 ηm, and $m_2$=94. The bandwidths that can be analogized from a set of parameters in each wavelength band calculated in this manner may be compared as follows. Herein, it is assumed that f=5456.25 mm and d=12 mm.

$$B|_{@c\text{-}band} = A\Delta x \frac{n_{s1}d}{m_1 f} \qquad [9]$$
$$= A\Delta x \frac{1.4550 \times 12}{80 \times 5456.25}$$
$$= 4 \times 10^{-5} \times A\Delta x;$$

and $$B|_{@o\text{-}band} = A\Delta x \frac{n_{s2}d}{m_2 f} \qquad [10]$$
$$= A\Delta x \frac{1.45831 \times 12}{94 \times 5456.25}$$
$$= 3.412 \times 10^{-5} \times A\Delta x$$

Upon calculating the ratio of the resultant values of equation 9, it can be appreciated that the bandwidth when the AWG operates on O-band light is reduced about 15% as compared to the operation on C-band light. This difference is caused by a change of effective refractive index and diffraction order according to the change of wavelength bands in equation 8, because it was assumed that the operations are made in a same component of symmetric configuration and thus the remaining parameters are unchangeable constants.

If the parameters f and d, which were nothing else than constants in equation 9 due to the symmetric configuration, can be turned into variables, it is possible to make bandwidths in two wavelength bands substantially the same with each other in such a manner that changes of the remaining parameters according to wavelength is compensated for by changing the values of the remaining two variables. In doing so, it is necessary to turn the conventional configuration which is symmetric with reference to the centerline of channel waveguides (or an AWG), into asymmetric one, so that left-right geometrical parameters can be independently varied. In this case, lights of different wavelength bands travel in opposite directions each other.

Now, in order to ascertain whether it is possible to apply design variables, which are independent from each other, to opposite directions by changing an AWG configuration, a grating equation for an AWG of asymmetric configuration will be derived.

Figure 4:
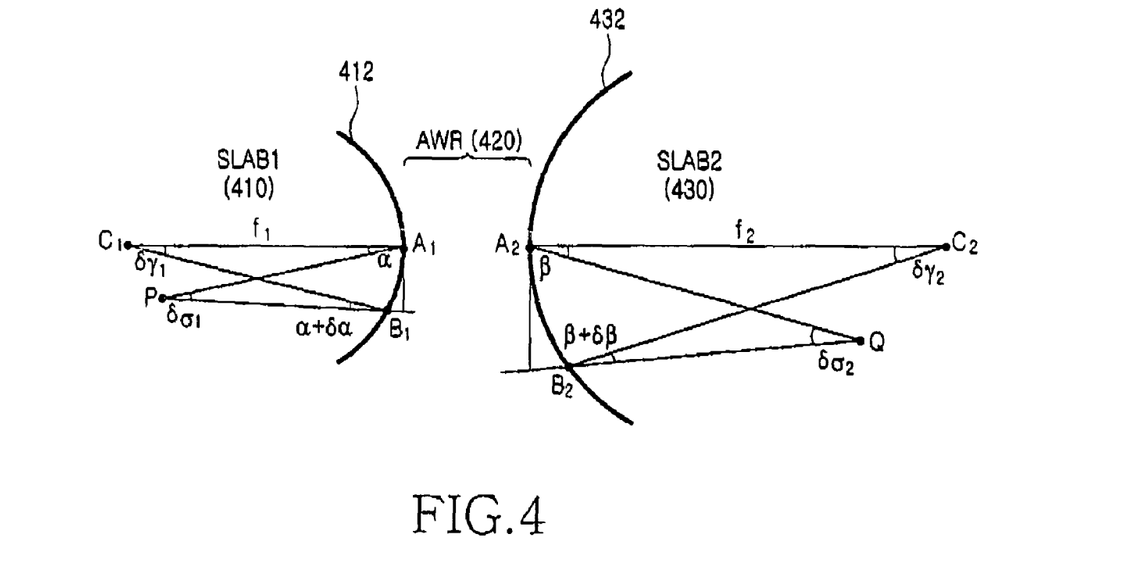
FIG. 4 schematically illustrates an asymmetric AWG configuration according to the present invention.

FIG. 4 illustrates an asymmetric AWG configuration according to the present invention. In this exemplary embodiment, there is shown a first slab waveguide 410, an arrayed waveguide region 420 consisting of a plurality of channel waveguides (not shown), and a second slab waveguide 430. The arrayed waveguide region 420 connects an end face of the first slab waveguide 410 and an end face 432 of the second slab waveguide 430.

$C_1$ represents a focal point of the first slab waveguide 410, $C_2$ represents a focal point of the second slab waveguide 430, P is an incident point (i.e., point light source), and Q is an exiting point (i.e., image-forming point). If grating equations for paths of adjacent two light beams that start from P and arrive at Q are solved on the assumption that P and Q are laid on arbitrary positions of the AWG and by simplifying the AWG as a grating of transmission type, it is possible to obtain equations for the traces of P and Q. From these equations, it is possible to derive the configurations of the first and second slab waveguides of the asymmetric AWG In this case, the grating equation for the optical path difference between the incident point P and the exiting point Q is represented by equation 10 as follows.

$$d_1 \sin \alpha + d_2 \sin \beta = m\lambda \qquad [10]$$

By differentiating the both sides, equation 11 is obtained.

$$d_1 \cos \alpha \partial \alpha + d_2 \cos \beta \partial \beta = 0 \qquad [11]$$

From the geometrical configuration of the first and second slab waveguides 410, 430 shown in the drawing, equation 12 is obtained as follows.

$$\alpha + \delta\gamma_1 = \alpha + \delta\alpha + \delta\sigma_1, \qquad [12a]$$

$$\beta + \delta\gamma_2 = \beta + \delta\beta + \delta\sigma_2 \qquad [12b]$$

In that case that $\delta\alpha$, $\delta\beta$, $\delta\gamma_1$, $\delta\gamma_2$, $\delta\sigma_1$, $\delta\sigma_2$ are very small in equations 12a, 12b, equation 13 is obtained as follows.

$$\delta\gamma_1 = \frac{A_1 B_1}{f_1}, \qquad \delta\gamma_2 = \frac{A_2 B_2}{f_2}, \qquad [13]$$

$$\delta\sigma_1 = \frac{A_1 B_1 \cos \alpha}{f_1}, \qquad \delta\sigma_2 = \frac{A_2 B_2 \cos \alpha}{f_2}$$

By substituting equation 13 for equation 11, equation 14 is obtained as follows.

$$d_1 \cos \alpha \left( \frac{A_1 B_1}{f_1} - \frac{A_1 B_1 \cos \alpha}{r_1} \right) + \qquad [14]$$
$$d_2 \cos \beta \left( \frac{A_2 B_2}{f_2} - \frac{A_2 B_2 \cos \beta}{r_2} \right) = 0$$

In equation 14, $d_1 \cos \alpha$ and $d_2 \cos \beta$ are not zero terms. Therefore, in order to satisfy equation 14, terms within each parentheses must be individually zero. A solution of equation 14 obtained from this condition equals to equation 15.

$$r_1 = f_1 \cos \alpha, \qquad [15a]$$

$$r_2 = f_2 \cos \beta \qquad [15b]$$

From equation 15, it would be recognized by those skilled in the art that P is positioned on a circle with a diameter of $f_1$, while Q is positioned on a circle with a diameter of $f_2$. That is, it can be mathematically derived that in order to meet an interference condition for a given grating, an incident point P will always exist on a Rowland circle which takes a focal distance $f_1$ of a fist slab waveguide 410 as a diameter thereof while an exiting point Q will always exist on a Rowland circle which takes a focal distance $f_2$ of a second slab waveguide 430 as a diameter thereof.

By applying a series of equations as mentioned above, it is possible to define geometrical parameters of first and second slab waveguides 410, 430 each located left and right, i.e., a length of first or second slab wave guide 410 or 430, f, a pitch of channel waveguides, d, a inclined angle (which is associated with $\alpha$ and $\beta$), or the like, in such a manner that they are different from each other in a left and right direction, only if the first and second slab waveguides 410, 430 each meet a Rowland circle configuration with different focal distances. In this case it is possible to make the AWG operate as has having different optical characteristics when it is operated on a-band light and b-band light (input and output sides being opposite to one another). That is, the first and second slab waveguides 410, 430 may be formed left-right asymmetric (which is associated with f, $\alpha$ and $\beta$) with reference to the centerline (not shown) of the channel waveguides (or the arrayed waveguide range). In another aspect, the channel waveguides have a first slab waveguide 410 side pitch and a second slab waveguide 430 side pitch with reference to the centerline thereof, the pitches being different from each other (which is associated with d). If this is applied to an example of the afore-mentioned O/C dual-band 16 channel AWG design, it is possible to obtain a result as represent by equation 16 as follows.

$$B|_{@c\text{-}band} = A\Delta x \frac{n_{s1} d_1}{f_1 m_1} \qquad [16a]$$

$$= A\Delta x \frac{1.4550 \times 12}{5456.25 \times 80}$$

$$= 4 \times 10^{-5} \times A\Delta x,$$

$$B|_{@o\text{-}band} = A\Delta x \frac{n_{s2} d_2}{m_2 f_2} \qquad [16b]$$

$$= A\Delta x \frac{1.45831}{94} \times \frac{d_2}{f_2}$$

$$= 4 \times 10^{-5} \times A\Delta x$$

$$= B|_{@\text{-}c\text{-}band}$$

Because it is intended to make the bandwidths in C-band and O-band identical, the value of $$\frac{d_2}{f_2}$$

is determined in such a manner that a change in O-band due to an effective refractive index and diffraction order of the first and second waveguides can be counterbalanced by $$\frac{d_2}{f_2}.$$

In this exemplary case, the value of $$\frac{d_2}{f_2}$$

in equation 16 becomes 0.002578327, and $d_2$ and $f_2$ may be selectively combined with one another to meet this value. In this way, it is possible to make the bandwidths in O-band and C-band match with each other.

Figure 5:
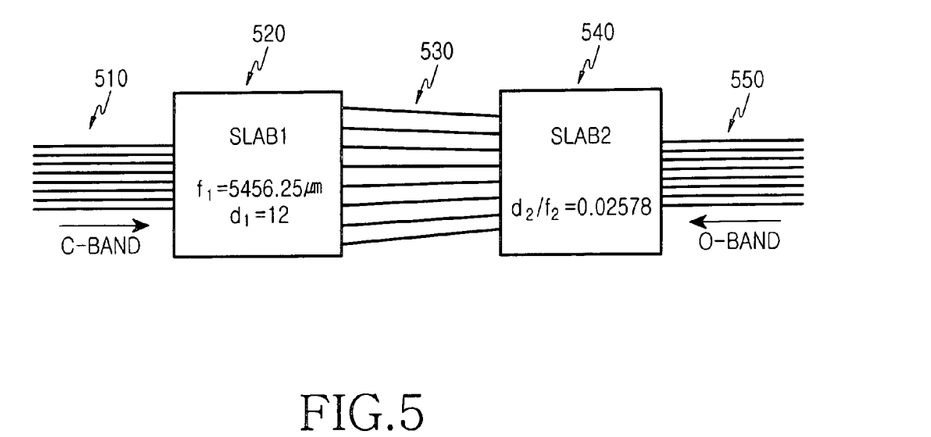
FIG. 5 schematically illustrates an O/C dual-band 16 channel asymmetric AWG configuration.

FIG. 5 illustrates an O/C dual-band 16 channel asymmetric AWG configuration according to the present invention. The AWG 500 comprises a plurality of input waveguides 510, a first slab waveguide 520, a plurality of channel waveguides 530 forming an arrayed waveguide region, a second slab wave guide 540, and a plurality of output waveguides 550. The input waveguides 510 are connected to a first end face of the first slab waveguide 520 and the channel waveguides 530 connect a second end face of the first slab waveguide 520 and a first end face of the second slab waveguide 540. The output waveguides 550 are connected to a second end face (typically referred to as "image plane") of the second slab waveguide 540. Herein, C-band lights are inputted into the input waveguides 510 and outputted to the output waveguides 550, and O-band lights are inputted into the output waveguides 550 and outputted to the input waveguides 510. In an exemplary example, C-band, $\lambda_{c1}$=1552.52 nm, $m_1$=80, $n_c(\lambda_1)$=1.4527, waveguides 530, or to form the channel waveguides in such a manner that the first slab waveguide 520 side pitch and the second slab waveguide 540 side pitch with reference to the centerline (not shown) are different from each other.

Figure 6:
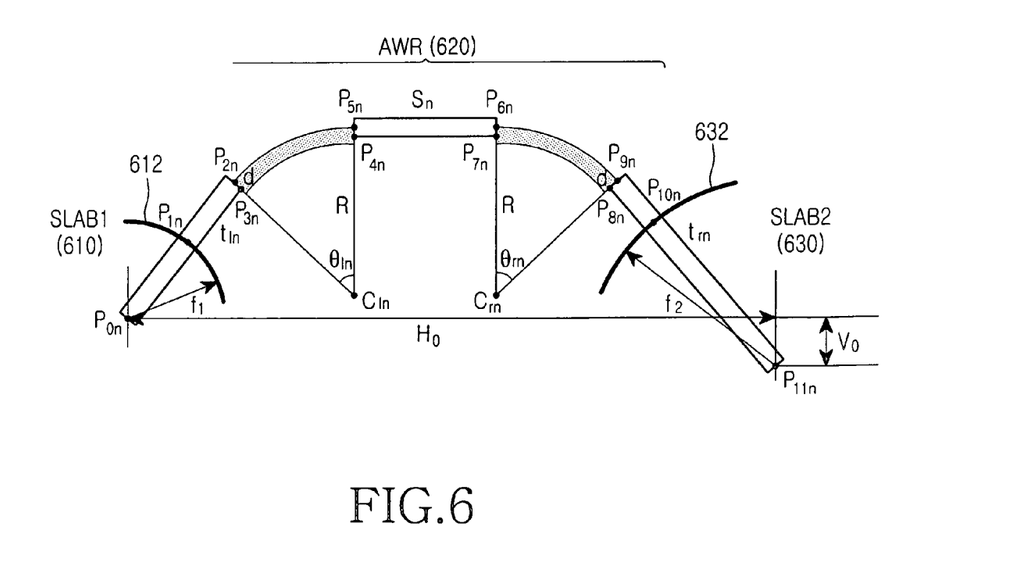
FIG. 6 illustrates parameters associated with configuring a physical layout of an asymmetric AWG according to the principles of the invention.

Hereinbelow, a method of configuring a physical layout of an asymmetric AWG according to the present invention will be described by way of an example shown in FIG. 6. Analogous to FIG. 4, which illustrates an asymmetric AWG configuration according to the present invention, the asymmetric AWG illustrated in FIG. 6 contains a first slab waveguide 610, an arrayed waveguide region 620, and a second slab waveguide 630. The arrayed waveguide region 620 connects an end face 612 of the first slab waveguide 610 and an end face 632 of the second slab waveguide 630. The following list of coordinates shows a series of coordinates of main points for visibly configuring the asymmetric AWG, as shown in FIG. 6, and following equation 17 represents a parameter-related equation.

List of coordinates [17]

$$P_{0n} = (0, 0)$$
$$P_{1n} = (f_1 \cos\theta_{ln}, f_1 \sin\theta_{ln})$$
$$P_{2n} = (t_{ln} \cos\theta_{ln}, t_{ln} \sin\theta_{ln})$$
$$P_{3n} = P_{2n} + (d\sin\theta_{ln}, -d\cos\theta_{ln})$$
$$C_{ln} = P_{3n} + (R\sin\theta_{ln}, -R\cos\theta_{ln})$$
$$P_{4n} = C_{ln} + (0, R)$$
$$P_{5n} = P_{4n} + (0, d)$$
$$P_{6n} = P_{5n} + (s_n, 0)$$
$$P_{7n} = P_{6n} + (0, -d)$$
$$C_{rn} = P_{7n} + (0, -R)$$
$$P_{8n} = C_{rn} + (R\sin\theta_{rn}, R\cos\theta_{rn})$$
$$P_{9n} = P_{8n} + (d\sin\theta_{rn}, d\cos\theta_{rn})$$
$$P_{11n} = P_{0n} + (H_0, -V_0)$$
$$P_{10n} = P_{11n} + (-f_2\cos\theta_{rn}, f_2\sin\theta_{rn})$$

$$\begin{bmatrix} \cos\theta_{ln} & 1 & \cos\theta_{rn} \\ \sin\theta_{ln} & 0 & -\sin\theta_{rn} \\ 1 & 1 & 1 \end{bmatrix} \begin{bmatrix} t_{ln} \\ s_n \\ t_{rn} \end{bmatrix} = \begin{bmatrix} H_0 - (R+d)(\sin\theta_{ln} + \sin\theta_{rn}) \\ (R+d)(\cos\theta_{ln} - \cos\theta_{rn}) - V_0 \\ t_{l1} + s_1 + t_{r1} + (R+d)(\theta_{l1} + \theta_{r1} - \theta_{ln} - \theta_{rn}) + (n-1)\Delta L \end{bmatrix}$$

$n_{s1}$=1.4550, $f_1$=5456.25 mm, and $d_1$=12 mm. For O-band, $\lambda_{c2}$=1324.7 nm, $m_2$=94, $n_c(\lambda_2)$=1.45645, $n_{s2}$=1.45831, and $$\frac{d_2}{f_2} = 0.002578.$$

In order to adjust $$\frac{d_2}{f_2},$$

it is possible to form the first and second slab waveguides 520, 540 in such a manner that they are asymmetric with reference to the centerline (not shown) of the channel As described above, an asymmetric arrayed waveguide grating (AWG) according to the present invention have several advantages as follows.

First, it is possible to realize a function for proceeding lights of two different wavelength bands in different directions through a change only in step of designing an AWG without changing a fabrication process of an existing AWG. This has an effect similar to one in which two existing AWGs are combined.

Second, the inventive AWG can implement a function for reducing or magnifying an existing optical field according to designing variables, while an existing AWG merely reproduces an optical field inputted into the AWG on an output side image plane in a same shape. That is, the existing AWG has a property of reproducing an input light on an output side image plane in a same size and shape as it is due to its symmetric configuration, whereas because the inventive AWG is made to have an asymmetric configuration with slab waveguides having different sizes, it is enabled to reproduce an input light on an image plane after magnifying or reducing the input light in proportion to the difference in size between the slab waveguides.

Third, the inventive AWG can be independently designed in left and right with reference to the centerline thereof so that the AWG has different operating characteristics depending on directions. Therefore, when the AWG is operated in different wavelength bands, it is possible to equalize the differences in operating characteristics resulted from the different wavelength bands. For example, even if wavelength bands are different, it is possible to make bandwidths identical.

Fourth, through the magnification or reduction function as described above, it is possible to magnify or reduce a slab waveguide (or a plane waveguide) or channel waveguides (or an arrayed waveguide range) according to an application field of such a component or a wavelength band. Therefore, in determining a size or shape of such a component, the present invention provides a better degree of freedom in the process of designing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An asymmetric arrayed waveguide grating comprising:
   at least one input waveguide;
   at least one output waveguide;
   a first slab waveguide;
   a second slab waveguide; and
   a plurality of channel waveguides connecting the first and second slab waveguides, wherein the first and second slab waveguides are left-right asymmetrically formed with reference to a centerline of the channel waveguides, and wherein equal number of the at least one input waveguide and the at least one output waveguide are coupled to the respective first and second slab waveguides.

2. An asymmetric arrayed waveguide grating as claimed in claim 1, wherein the first and second slab waveguides have different lengths from each other.

3. An asymmetric arrayed waveguide grating as claimed in claim 1, wherein the first and second slab waveguides are inclined in different angles with reference to the centerline of the channel waveguides.

4. An asymmetric arrayed waveguide grating as claimed in claim 1, wherein the channel waveguides have a first slab waveguide side pitch and a second slab waveguide side pitch with reference to the centerline thereof, the pitches being different from each other.

5. The asymmetric arrayed waveguide grating as claimed in claim 1, wherein a ratio of a side pitch $d_2$ and a focal distance $f_2$, $d_2/f_2$, of the second slab waveguide has a predetermined value such that different first and second wavelengths input to the asymmetric arrayed waveguide from opposite directions have identical bandwidths.

6. The asymmetric arrayed waveguide grating as claimed in claim 5, wherein the asymmetric arrayed waveguide grating satisfies the following equation:

$$\frac{n_{s1}d_1}{m_1 f_1} = \frac{n_{s2}d_2}{m_2 f_2}$$

wherein $n_{s1}$ denotes an effective refractive index of the first slab waveguide, $n_{s2}$ denotes an effective refractive index of the second slab waveguide, $d_1$ denotes a first slab waveguide side pitch, $m_1$ denotes diffraction order for the first wavelength band, $m_2$ denotes diffraction order for the second wavelength band, and $f_1$ denotes a focal distance of the first slab waveguide.

7. An asymmetric arrayed waveguide grating comprising at least one input waveguide, at least one output waveguide, a first slab waveguide, a second slab waveguide and a plurality of channel waveguides connecting the first and second slab waveguide, wherein the channel waveguides have a first slab waveguide side pitch $d_1$ and a second slab waveguide side pitch $d_2$ with reference to the centerline thereof, the pitches being different from each other, and
   wherein a ratio of the side pitch $d_2$ and a focal distance $f_2$, $d_2/f_2$, of the second slab waveguide has a predetermined value such that different first and second wavelengths input to the asymmetric arrayed waveguide from opposite directions have identical bandwidths.

8. An asymmetric arrayed waveguide grating as claimed in claim 7, wherein the first and second slab waveguides have different lengths from each other.

9. An asymmetric arrayed waveguide grating as claimed in claim 7, wherein the first and second slab waveguides are inclined in different angles with reference to the centerline of the channel waveguides.

10. The asymmetric arrayed waveguide grating as claimed in claim 7, wherein equal number of the at least one input waveguide and the at least one output waveguide are coupled to the respective first and second slab waveguides.

11. The asymmetric arrayed waveguide grating as claimed in claim 7, wherein the asymmetric arrayed waveguide grating satisfies the following equation:

$$\frac{n_{s1}d_1}{m_1 f_1} = \frac{n_{s2}d_2}{m_2 f_2}$$

wherein $n_{s1}$ denotes an effective refractive index of the first slab waveguide, $n_{s2}$ denotes an effective refractive index of the second slab waveguide, $d_1$ denotes a first slab waveguide side pitch, $m_1$ denotes diffraction order for the first wavelength band, $m_2$ denotes diffraction order for the second wavelength band, and $f_1$ denotes a focal distance of the first slab waveguide.

12. An arrayed waveguide for transmitting wavelengths of different optical bands in opposing directions, comprising:
   at least one input waveguide;
   at least one output waveguide;
   a first slab waveguide, the first slab waveguide having a first focal length;
   a second slab waveguide, the second slab waveguide having a second focal length; and
   a plurality of channel waveguides connecting the first and second slab waveguides, wherein the first and second slab waveguides each meet a Rowland circle configuration and said first and second focal lengths are different, and wherein equal number of the at least one input waveguide and the at least one output waveguide are coupled to the respective first and second slab waveguides.

13. The waveguide as claimed in claim 12, wherein the first and second slab waveguides are inclined at different angles with reference to the centerline between said first and second slab waveguides.

14. The waveguide as claimed in claim 12, wherein said second slab waveguide focal length is set in relation to said first slab waveguide focal length and a desired wavelengths in said optical bands.

15. The waveguide as claimed in claim 12, wherein a ratio of a side pitch $d_2$ and the second focal length $f_2$, $d_2/f_2$, of the second slab waveguide has a predetermined value such that different first and second wavelengths input to the asymmetric arrayed waveguide from opposite directions have identical bandwidths.

16. The waveguide as claimed in claim 15, wherein the arrayed waveguide satisfies the following equation:

$$\frac{n_{s1}d_1}{m_1 f_1} = \frac{n_{s2}d_2}{m_2 f_2}$$

wherein $n_{s1}$ denotes an effective refractive index of the first slab waveguide, $n_{S2}$ denotes an effective refractive index of the second slab waveguide, $d_1$ denotes a first slab waveguide side pitch, $m_1$ denotes diffraction order for the first wavelength band, $m_2$ denotes diffraction order for the second wavelength band, and $f_1$ denotes a focal distance of the first slab waveguide.

* * * * *